May 3, 1932. A. VAN DUYN 1,856,894
WORK SUPPORT FOR SLICING MACHINES
Filed July 11, 1927 2 Sheets-Sheet 1
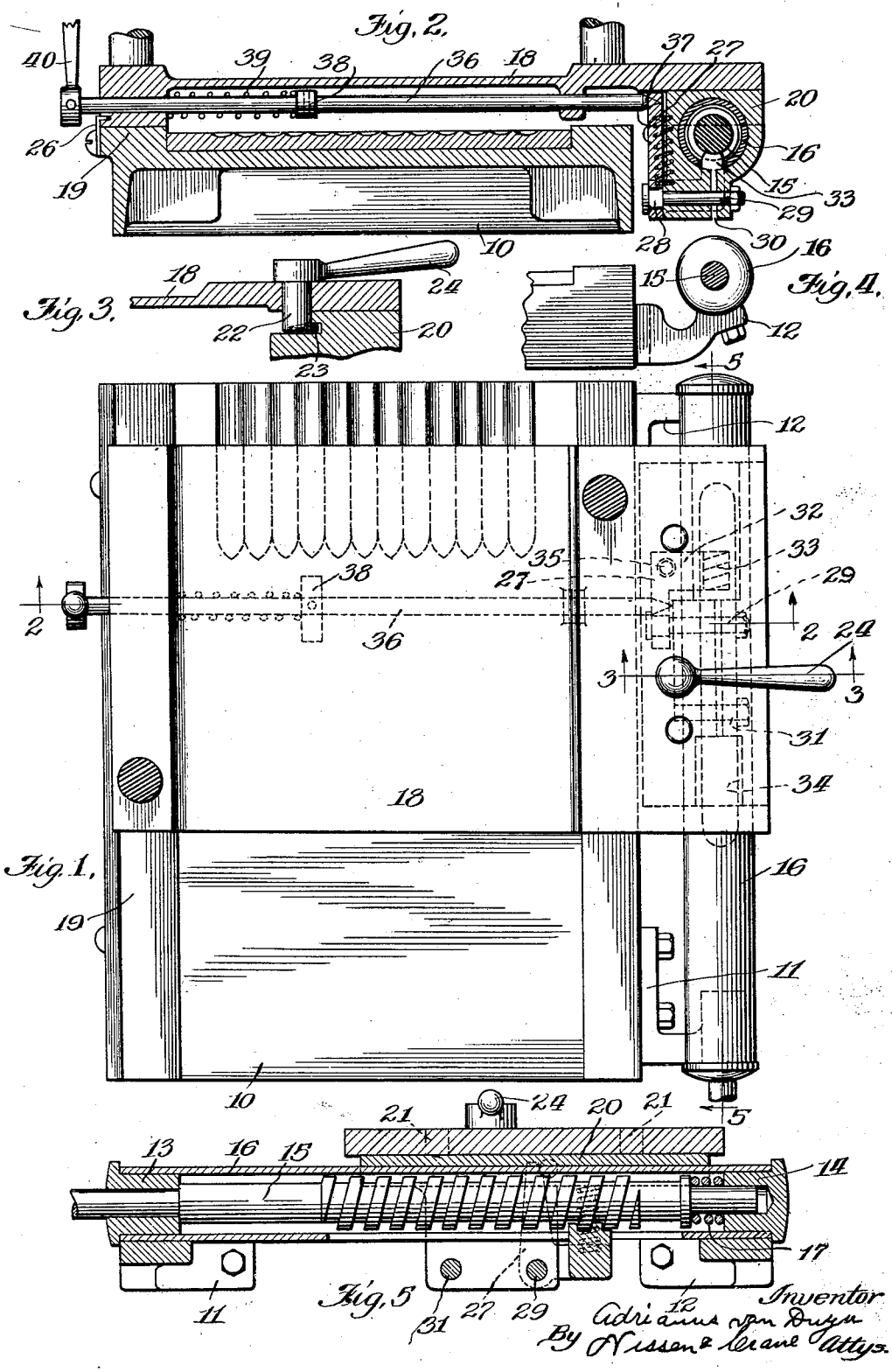

May 3, 1932. A. VAN DUYN 1,856,894
WORK SUPPORT FOR SLICING MACHINES
Filed July 11, 1927 2 Sheets-Sheet 2
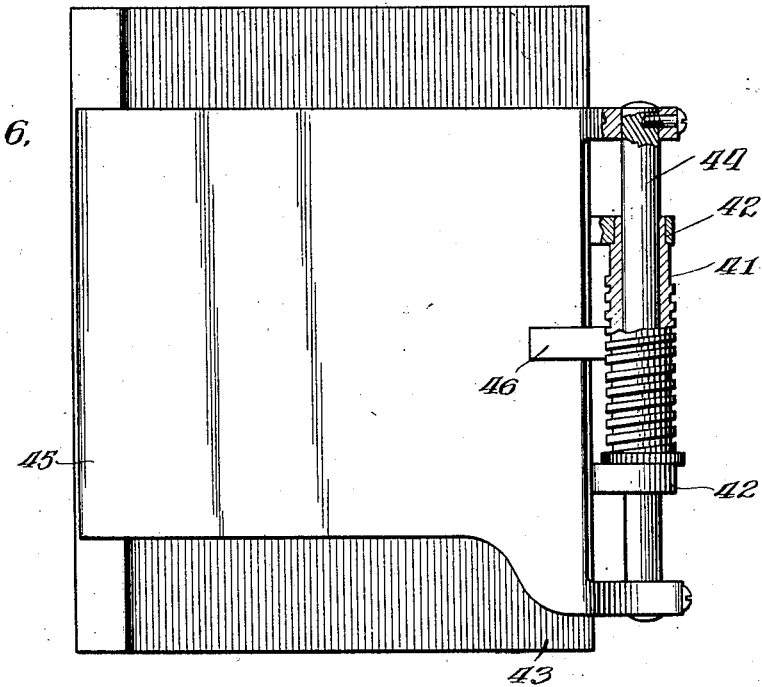

Patented May 3, 1932

1,856,894

UNITED STATES PATENT OFFICE

ADRIANUS VAN DUYN, OF ROTTERDAM, NETHERLANDS, ASSIGNOR TO U. S. SLICING MACHINE COMPANY, OF LA PORTE, INDIANA, A CORPORATION OF INDIANA

WORK SUPPORT FOR SLICING MACHINES

Application filed July 11, 1927, Serial No. 204,747, and in the Netherlands October 15, 1926.

This invention relates to machines for slicing meat and other commodities and has for its object the provision of an improved work support and its feeding mechanism.

The invention is exemplified in the combination and arrangement of parts shown in the accompanying drawings and described in the following specification, and it is more particularly pointed out in the appended claims.

In the drawings:—

Fig. 1 is a somewhat fragmentary top plan view of the work support for a slicing machine showing one embodiment of the present invention applied thereto;

Fig. 2 is a section substantially on line 2—2 of Fig. 1;

Fig. 3 is a fragmentary vertical section on line 3—3 of Fig. 1;

Fig. 4 is a fragmentary end view of the support for the feed screw;

Fig. 5 is a section substantially on line 5—5 of Fig. 1;

Fig. 6 is a top plan view of a modified form of the invention.

In machines for slicing meat and other commodities, it is desirable that the work support which is fed step by step toward the cutting plane of the slicing knife shall be firmly held against angular movement relative to its direction of feed in order to avoid uneven slices. It is also desirable that the work support shall be mounted to slide with as much ease as possible consistent with accurately guided movement. It is also desirable to protect the feed screw and other operating parts so that the lubricated surfaces will be covered. The present invention provides for these and other improved features as will appear from the following description.

Referring first to Figs. 1 to 5, inclusive, the numeral 10 designates the traveling carriage of a slicing machine of well known construction in which a reciprocating carriage moves back and forth past the cutting edge of a rotary circular slicing knife. Brackets 11 and 12 are secured to the edge of the carriage 10 and support bearings 13 and 14 respectively in which is journaled a screw spindle 15. A sleeve 16 is supported on the bearings 13 and 14 and surrounds the spindle 15 forming a tubular housing for the screw spindle. A spring 17 normally holds the screw spindle 15 at one extremity of its range of axial movement in its bearings 13 and 14 to prevent longitudinal play of the screw shaft. A work support 18 is mounted on the reciprocating table 10 for sliding movement thereon in the direction of the axis of the spindle 15. One edge of the work support 18 slides upon a flat guide 19 at one side of the table 10 and the opposite edge of the work support 18 is provided with a slide block 20 through which the sleeve 16 extends. The sleeve 16 may be assembled with the block 20 prior to securing the sleeve in place on the bearings 13 and 14. The upper surface of the block 20 is provided with upwardly projecting locating pins 21 which enter openings in the work support 18 to locate the block 20 relative to the work support. The block 20 is clamped to the work support 18 by means of a stud 22 having a cam flange 23 thereon for engaging a groove formed in the block 20, as illustrated in Fig. 3. The stud 22 is connected to a handle 24 by which the stud 22 may be rotated to lock the block 20 to the support 18. By releasing the cam flange 23 from the block 20, the support 18 may be lifted from the reciprocating table. A retainer plate 26 is secured to the reciprocating table 10 at the side opposite the screw 15 and engages a slot in the edge of the work support to prevent accidental upward movement of the work support when the stud 22 is rotated to release the work support from the block 20. The right hand edge of the work support 18, as viewed in Fig. 2, may be lifted a sufficient amount to permit the work support to be moved laterally to disengage the support from the retainer plate 26.

A bell crank lever 27 is pivotally mounted on a bearing portion 28 of a bolt 29 which extends through the block 20 below the sleeve 16. The lower portion of the block 20 is provided with a slot 30 which permits the block to be tightened upon the sleeve 16 to compensate for any wear between the block and sleeve. A second bolt 31 also passes through the block 20 for holding the block in position about the sleeve. The horizontal arm of the bell crank lever 27 is provided with a laterally projecting portion 32 which carries a toothed or threaded member 33 for engaging the threads on the screw spindle 15. The sleeve 16 is provided with a longitudinal slot 34 in the bottom portion thereof that admits the toothed member 33. A spring 35 tends to rotate the bell crank 27 in a direction to free the toothed member 33 from the spindle 15. A bar 36 extends beneath the work support 18 and is provided with a pointed end 37 for engaging the upright arm of the bell crank 27 to hold the toothed member 33 in mesh with the feed screw 15. The bar 36 is mounted to slide longitudinally and is provided with a collar 38 engaged by a spring 39 which urges the pointed end 37 of the bar into operative engagement with the bell crank 27. A handle 40 is attached to the end of the bar 36 by means of which the bar may be drawn against the tension of the spring 39 to release the toothed member 33 from the feed screw 15. When this is done, the work support 18 may be slid freely upon the table 10 by pressure on the handle 40. The bar 36 is held against excessive rotary movement by the collar 38 which extends at each side of the bar 36 a sufficient amount to engage the lower face of the support 18 and arrest rotary movement of the bar. When it is desired to re-engage the toothed member 33 with the feed screw 15, the bar 36 is moved to the left, in Fig. 1 and the lever 27 is swung by hand about the bearing 28 against the action of the spring 35. The bar 36 is then released and is moved by the spring 39 against the lever to prevent rotation of the lever and disengagement of the toothed member 33 by the action of the spring 35.

It will be seen that the arrangement provides a guide for the work support which holds the work support against movement transverse to the sliding movement of the table in all directions and that the guide and feed screw are arranged in telescopic relation so that they occupy the space formerly occupied by the feed screw alone. The feed screw is enclosed in the guide so that the lubrication on the threads thereof is not exposed and the screw is protected from accumulation of foreign matter.

In the form of the invention shown in Fig. 6, a feed screw 41 is journaled in brackets 42 on the reciprocating table 43 and a spindle 44 is secured to the work support 45 and slides longitudinally through the center of the feed screw 41. A toothed member 46 is mounted on the work support 45 and engages the threads of the feed screw in the usual way.

I claim:—

1. A slicing machine comprising a table, a work support slidably mounted on said table, a hollow guide member for said work support, a feed screw disposed within said guide member, said guide member having a longitudinal slot therein opening downwardly, and a feed block extending through said slot and having teeth thereon for engaging said feed screw to feed said work support relative to said table when said feed screw is rotated.

2. A slicing machine comprising a table, a work support slidably mounted on said table, a hollow guide member mounted on said table, a feed screw journaled on said table and disposed within said hollow guide member, a slide block secured to said work support and surrounding said hollow guide member, said guide member having a slot in the lower side thereof, a feed block mounted on said work support and having a toothed portion extending through said slot and meshing with the threads on said feed screw, and means for moving said feed block to disengage said toothed portion from said feed screw.

3. A slicing machine comprising a feed table, a feed screw journaled at one side of said feed table, a tubular guide member enclosing said feed screw, a work support slidably mounted on said feed table, a block slidably mounted on said tubular guide member, said tubular guide member having a longitudinal slot therein opening downwardly, means for operatively connecting said work support and said block, an arm movably mounted on said slide block, a toothed member carried by said arm and extending through said slot to engage the threads on said feed screw, operating means co-operating with said arm for moving said arm in one direction to thereby move said toothed member into engagement with the feed screw, and a second operating means for moving said toothed member out of engagement with the feed screw, one of said operating means being a spring.

4. A slicing machine comprising a substance supporting table, a feed screw, a cover over said feed screw substantially enclosing the same, said cover having a slot therein opening downwardly, and a feed nut carried by said feed table and extending through said slot into engagement with said feed nut for feeding said table as said feed screw is rotated.

5. In a slicing machine, the combination with a table, of a work support carried by said table, a feed screw at one side of said table, a cover substantially enclosing said feed screw except at the bottom thereof, said cover having an opening at the bottom thereof below said feed screw, a feed nut carried by said work support and in engagement with said feed screw, a bearing member on said work support slidably engaging said cover and having bearing engagement therewith at points spaced a substantial distance from each other along said cover to prevent twisting movement of said work support in a direction transversely to the normal movement of said work support, co-operating bearing surfaces on said work support and table, and a guide for guiding the side of said work support which is opposite to that side which carries the feed nut, said guide also assisting to prevent twisting of said table in the aforementioned direction.

6. A slicing machine comprising a work table, a feed plate slidably mounted on said work table, a feed screw carried by said work table adjacent one side thereof, a cover over said feed screw having an opening extending downwardly, a feed nut on said feed table extending through said opening into engagement with said feed screw, and means for guiding said feed plate along said work support.

7. A slicing machine comprising a table, a feed screw journaled at one side of said table, a tubular guide member enclosing said feed screw, a work support slidably mounted on said table, a block slidably mounted on said tubular guide member and positively guided thereby, means for detachably securing said work support to said slide block, means for holding said slide block in operative position on said tubular guide independently of its connection with said work support, said tubular guide member having a longitudinal slot therein, a lever pivotally mounted on said slide block, a toothed member mounted on said lever and extending through said slot to engage the threads on said feed screw, means cooperating with said lever for moving said lever in one direction into engagement with said toothed member, and means for moving said lever in the other direction out of engagement with said toothed member.

In testimony whereof I have signed my name to this specification on this 13th day of June A. D. 1927.

ADRIANUS van DUYN.